United States Patent
Krym et al.

(10) Patent No.: US 8,391,224 B2
(45) Date of Patent: Mar. 5, 2013

(54) PROACTIVE LOAD DISTRIBUTION FOR 802.111-BASED WIRELESS LANS

(75) Inventors: Marvin Krym, Nepean (CA); Jozef Babiarz, Kanata (CA); Lambertus Verberk, Woodlawn (CA); Kenan Xu, Richmond Hill (CA); Ping Wu, Kanata (CA)

(73) Assignee: Avaya Inc., Basking Ridge, NJ (US)

( * ) Notice: Subject to any disclaimer, the term of this patent is extended or adjusted under 35 U.S.C. 154(b) by 338 days.

(21) Appl. No.: 12/716,180

(22) Filed: Mar. 2, 2010
(Under 37 CFR 1.47)

(65) Prior Publication Data
US 2011/0058478 A1 Mar. 10, 2011

Related U.S. Application Data

(60) Provisional application No. 61/156,994, filed on Mar. 3, 2009.

(51) Int. Cl.
*H04W 4/00* (2009.01)
(52) U.S. Cl. ......... 370/329; 370/349; 370/230; 370/235
(58) Field of Classification Search .................. 370/233, 370/234, 235, 235.1, 252, 229, 230, 231, 370/230.1, 349, 329
See application file for complete search history.

(56) References Cited

U.S. PATENT DOCUMENTS

| | | | |
|---|---|---|---|
| 6,522,881 B1 * | 2/2003 | Feder et al. .................... | 455/437 |
| 7,042,988 B2 * | 5/2006 | Juitt et al. ................... | 379/88.17 |
| 7,113,497 B2 | 9/2006 | Cromer et al. | |
| 7,177,649 B1 * | 2/2007 | Nielsen .......................... | 455/453 |
| 7,203,183 B2 | 4/2007 | Cromer et al. | |
| 7,577,453 B2 | 8/2009 | Matta | |
| 7,822,064 B2 * | 10/2010 | Thubert et al. ................ | 370/468 |
| 2006/0056348 A1 | 3/2006 | Marinier et al. | |
| 2006/0142021 A1 * | 6/2006 | Mueckenheim et al. ...... | 455/453 |
| 2006/0293060 A1 * | 12/2006 | Yang et al. ..................... | 455/453 |

* cited by examiner

*Primary Examiner* — Brenda H Pham
(74) *Attorney, Agent, or Firm* — Sheridan Ross P.C.

(57) ABSTRACT

A wireless communication system is able to balance load in a wireless network based on radio frequency (RF) utilization, signal strength, quality of signal (QoS), and other measures. The load may be dynamically moved to other wireless access points within the wireless network based on the amount of load on one or more of the access points and on the measures. As such, at different load conditions, the system can change the methods of how to determine which access point should handle a communication session. Further, the system provides methods for proactively adjusting the load in the wireless network before any one access point reaches its capacity.

16 Claims, 9 Drawing Sheets

PROACTIVE LOAD DISTRIBUTION FOR 802.111-BASED WIRELESS LANS

CROSS REFERENCE

This application claims priority to U.S. Provisional Application Ser. No. 61/156,994, filed Mar. 3, 2009, entitled "A Practical Measurement-Based Session Admission Control for Wi-Fi LAN Systems," which is incorporated herein by reference in its entirety, and is related to U.S. Application Ser. No. 12/716,168, filed Mar. 2, 2010, entitled "Practical Measurement-Based Session Admission Control for Wi-Fi-LAN Systems" which is incorporated herein by reference in its entirety.

BACKGROUND

Improving the quality of service for voice over internet protocol (VoIP) over wireless Local Area Networks (LANs) is on the critical path to achieving the vision of the unwired enterprise. Achieving high quality VoIP poses several challenges, particularly in heavily loaded systems. Wireless systems generally use signal strength as the determinant factor for which wireless access point should accept a communication session with a mobile device. In many situations, a small number of access points become overloaded as those access points are in high usage areas but have the best signal strength.

As a calling party or mobile user moves relative to an access point, the RF bandwidth requirements may change (increase or decrease) drastically, depending on the change in distance. Since this change is not accounted for by traditional call admission control algorithms, resource overload can result. Counting sessions as they arrive, for instance, and denying calls beyond a specific number requires over-engineering to account for bandwidth variability. RF-based connections, unlike wired connections, are subject to much more interference (i.e., other radios, noise sources, etc.), which can affect RF bandwidth requirements for the session. RF bandwidth is partitioned across different traffic classes, voice, video, and data, which may result in unused RF bandwidth, if not needed by one of the traffic classes. As callers move from one access point zone to the next access point zone, the likelihood of the adjacent access point taking over the call must remain high (almost independent of call volume) to prevent unexpected disconnections.

Presently, there are no good methods for balancing load based on other factors beyond signal strength and addressing the other issues mentioned above. Direct measurement of RF utilization is generally not available. Hybrid techniques for estimating RF utilization by applying mathematical models to partial measurements are relatively complex, particularly from modeling the behavior in the collision region, and therefore impractical. Further, user datagram protocol (UDP) traffic is not separately balanced for load. Finally, load balancing is generally accomplished only when bandwidth is completely allocated, which can cause errors when trying to quickly move loads to other systems.

SUMMARY

It is with respect to the above issues and other problems that the embodiments presented herein were contemplated. Embodiments of systems and methods provide a system that is able to balance load in a wireless network based on radio frequency (RF) utilization, signal strength, quality of signal (QoS), and other measures. The load may be dynamically moved to other wireless access points within the wireless network based on the amount of load on one or more of the access points and on the measures. As such, at different load conditions, the system can change the methods of how to determine which access point should handle a communication session. Further, the system provides methods for proactively adjusting the load in the wireless network before any one access point reaches its capacity. In this configuration, the system prohibits voice and video calls from operating in the collision region to maintain an adequate QoS. Data sessions can operate in the non-collision or collision regions and are not admission-controlled.

The embodiments presented can use a combination of factors (i.e., RF bandwidth utilization, RF bandwidth utilization by traffic class (e.g., voice or video), the radio interference transmission rate for each terminal, the extent of co-channel interference or noise present on the RF channel, and the received signal strength, which varies with distance to the access point and the physical barriers in the transmission path), which are direct resource usage measures to identify a target access point. The product of these measurements, in one configuration, is calculated for use in call admission control and/or load balancing. Measuring RF utilization in the non-collision region can be simple because the RF utilization is normally a linear function of the frame transmission time, which is measured easily on a traffic class basis. Measurements of RF utilization may be made on a per access/traffic class basis. Generally, the 802.11 access/traffic categories or classes are defined as voice, video, best effort, and background. There is no rule or requirement that actual voice data use the voice access category. These are the most important and the most direct factors in determining the best and most available access point. The weight assigned to each factor depends on load. At low loads, signal strength is favored to RF efficiency. In contrast, at high loads, RF utilization is favored to maximize carried load. This measure can account for the variable environmental factors inherent in wireless systems.

The embodiments quickly assess when a quality threshold is crossed. Then, the wireless LAN controller algorithms can force handoffs of communications sessions to better access points with more available RF resources or less interference. A technique to avoid over-acceptance during periods of high call request rates, full bandwidth is assumed to be used immediately upon call acceptance. Over time, the calculated bandwidth usage decays to the measured bandwidth usage according to a configurable time constant. Similarly, if the measurement system detects a sharp increase in bandwidth usage due to some type of interference (i.e., a physical barrier or noise), then the system ensures that new admission decisions are made based on the updated usage. The result is a seamless method for maintaining good quality connections with mobile devices.

Further, the embodiments can manage different classes of data differently. Voice and Video communications are handled differently than data communications. The embodiments handle the distribution of video and voice communications separately from data communications. The embodiments also proactively distribute loads. Proactive load distribution is tunable based on predetermined thresholds to determine how early to begin load balancing. Proactive load balancing is most useful for users with clusters of overloaded access points. In an example of proactive load balancing, there may be one or more access points at points or areas of high demand. One or more other access points may be concentrically distributed, in ever increasing distances, around the access point experiencing high demand. Proactive load balancing can shift load away from the high-demand access point at the center of the high demand area to access points outside the center of high demand. Further, the load can be shifted in anticipation of any bandwidth requirements or limitations to accept load from the central point of high demand.

For example, a lobby of a conference room center (during a break when the attendees step outside and starts using their smart phone devices to make phone calls, access email etc.) may have high demand. This high demand can be shifted to other access points in other areas of the conference room center, e.g., a separate lobby area, another conference room, etc. The load can be moved proactively as load appears to increase, so that no one person loses a call or cannot make a call.

In one configuration, call admission is effected by comparing estimated RF utilization, which includes the new call request, to the bandwidth allocated to the traffic class. When there is adequate bandwidth available, the decision is made to admit the call. When there is inadequate bandwidth, the algorithm allows borrowing of bandwidth from other traffic classes up to a specified limit. This procedure can provide near maximum system level bandwidth utilization. Borrowing bandwidth from different traffic classes has another benefit. When an RF event results in over-bandwidth usage for a traffic class, then, temporarily, traffic classes can borrow from each other until a proper usage is restored. For example, when an RF event results in voice bandwidth usage doubling, then voice calls can use video or data bandwidth. As users end their calls, bandwidth usage will naturally decay and new admissions will be based on the new level of bandwidth available. This procedure ensures graceful readjustment during unexpected RF events (e.g., interference, barriers, etc.) without dropping sessions. In particular, sharing bandwidth with the data traffic class is readily permitted because it is usually the largest allocation and because the Transmission Control Protocol (TCP) most easily adjusts to changes in bandwidth. Dedicated bandwidth allocations are made for mobility traffic and emergency calls to substantially maximize their success probability.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the computer systems are considered to include a tangible storage medium and prior art-recognized equivalents and successor media, in which the software implementations of the present embodiments are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the systems and methods are described in terms of exemplary embodiments, it should be appreciated that individual aspects of the embodiments can be separately claimed.

The term "collision" means the result of two or more devices attempting to wirelessly transmit signals at the same time on the same RF channel causing interference with the transmissions where the transmissions can become garbled.

The term "collision region" means the access point bandwidth utilized above a certain point in which more transmissions will cause collisions.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It should be understood that various changes may be made in the function and arrangement of elements without departing from the spirit and scope of the appended claims.

Figure 1:
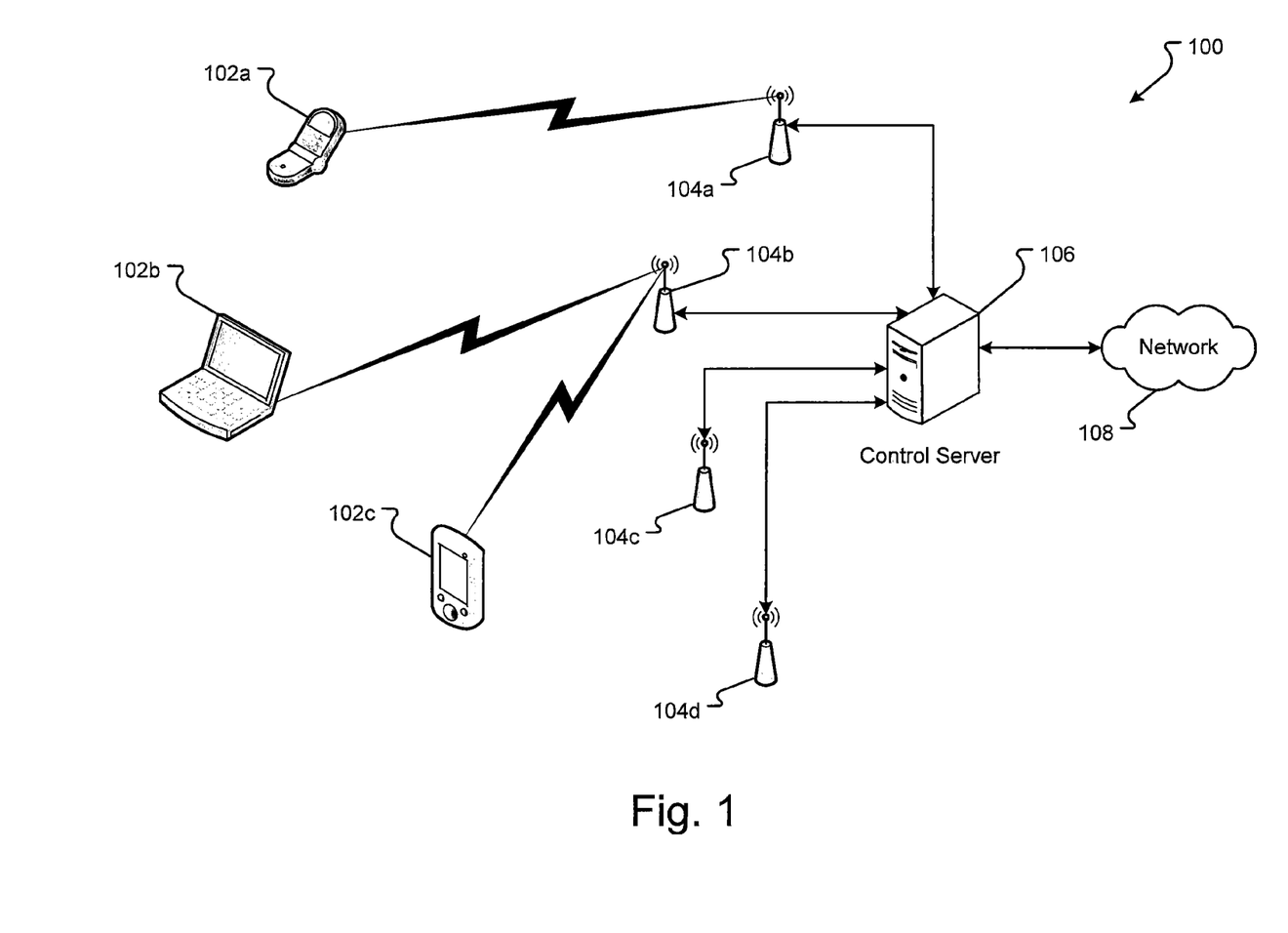
FIG. 1 is a block diagram of an embodiment of a communication system operable to determine the admission of a communication session with an access point.

A communication system 100 for determining the admission of a communication session to an access point 104 is shown in FIG. 1. Communication system 100 can include at least one mobile device 102a, 102b and/or 102c, at least one wireless access point 104a, 104b, 104c, and/or 104d, and at least one control server 106. The communication system 100 can have more or, fewer mobile devices 102, access points 104, or control servers 106 than those shown in FIG. 1. The communication system 100 of FIG. 1 is provided only as an example to help describe the functions of the system.

A mobile device 102 can include cellular telephones, mobile telephones, laptop computers, personal digital assistants, and other devices that are able to communicate wirelessly. The mobile devices 102 may communicate according to the 802.11 protocol. Regardless, the mobile devices 102 are able to communicate with access points 104a, 104b, 104c, and/or 104d. In some embodiments, the mobile device 102 may be able to communicate voice data, video data, and/or other data. Regardless, the mobile device 102 can be any hardware, software, or hardware and software that may be operable to complete the functions described herein. The mobile device 102 may be a computer system as described in conjunction with FIGS. 8 and 9.

A wireless access point 104, hereinafter referred to as an access point, can be any device that provides wireless communication to a mobile device 102. The wireless access point 104 can have one or more radios that can communicate with mobile devices 102. As such, the description that follows can apply to one or more radios at one or more access points 104. In other words, admissions and load balancing can be specific to a radio or and access point with one or more radios. Radios may collect utilization information individually, such that, each access point 104 provides two or more sets of utilization information.

In the communication system 100, an access point 104 is any device that allows mobile devices 102 to connect to a network using 802.11 Wi-Fi, Bluetooth or related standards. The access points 104 may be connected or in communication with the control server 106 through a wired network or may relate data through one or more other wireless devices to the control server 106. The access points 104 can include any hardware, software, or hardware and software that are operable to complete the functions explained herein. Access points 104 may be computer systems as described in FIGS. 8 and 9. An example of an access point 104 may be the Linksys WAP54G 802.11 G Wireless access point. There are other examples of access points 104 that may be available. The access points 104 can receive communications or be in communication with mobile devices 102, relay information to the control server 106 or send data over a network 108. The data received by the access point 104 can be video, voice, or other data. An embodiment of an access point 104 is described in conjunction with FIG. 2.

The control server 106 can be any hardware, software or hardware and software that is operable to control the admission of a communication session from a mobile device 102 to an access point 104. The control server 106 can be a computer system, as described in FIGS. 8 and 9. An example of a control server 106 is described in conjunction with FIG. 2. The control server 106 can receive information or data from access points 104 to determine the admission of a communication session from a mobile device 102. A communication session may be any exchange of data including voice calls. If a mobile device 102 is requesting bandwidth, the control server 106 may receive data or information from the mobile device 102 an access point 104, and a network 108. Thus, the control server 106 can functionally enable telephone calls, Internet sessions, or other types of communication sessions from a mobile device 102 to another party over the access point 104 through the network 108.

Figure 2:
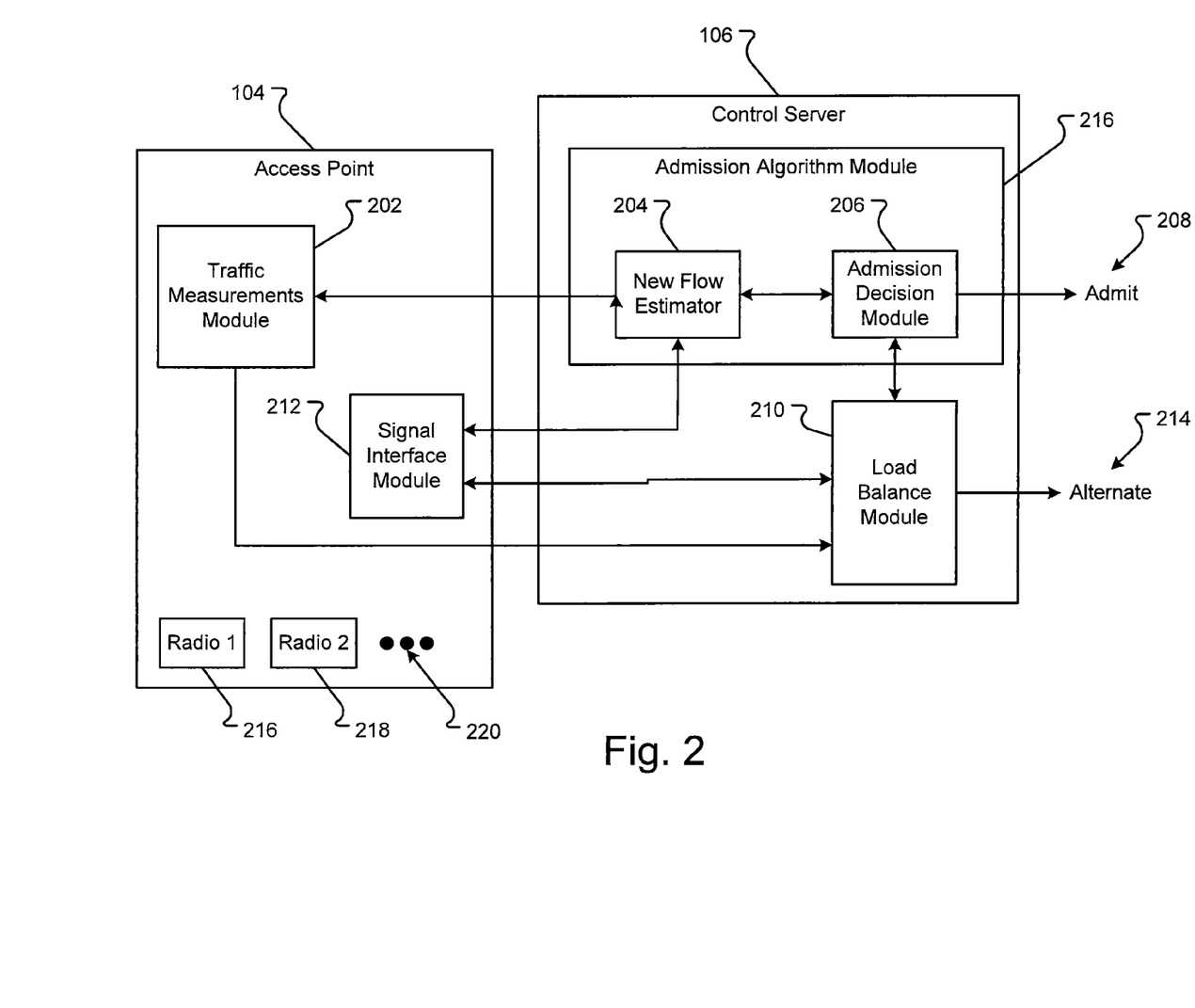
FIG. 2 is a block diagram of an embodiment of an access point and a control server operable to determine the admission of a communication session with an access point.

Embodiments of an access point 104 and control server 106 are shown in FIG. 2. The embodiments of the access point 104 and control server 106 may include software modules that are executed by a processor, as described in conjunction with FIGS. 8 and 9. In other embodiments, the modules or functions described in conjunction with FIG. 2 are embodied or constructed within a hardware device that is made to complete the functions, such as an application specific integrated circuit (ASIC) or field programmable gate array (FPGA). Regardless of the device or architecture of the hardware, the processor can execute the functions described herein. The access point 104, as explained above, may include one or more radios 216 and/or 218. There may be more of fewer radios than those shown in FIG. 2, as represented by ellipses 220. The radios 216, 218 function to provide wireless communications with one or more mobile devices 102.

Access point 104 can include a traffic measurements module 202 and a signal interface module 212. The traffic measurements module 202 is operable to measure the utilization of the radio frequency bandwidth of the access point 104 and/or for one or more of the radios 216, 218. The measurements may be computed on a per communication session basis. The traffic measurements module 202 may also calculate the amount of RF utilization for an access class. An access class can be a class of data as described in the 802.11 standard, such as voice, video, best-effort data, and background data. Other data can include data exchanged in an Internet session or in a file transfer. Each access class can have a predetermined bandwidth allotment. The measured and/or calculated RF utilization may be sent to a new flow estimator 204 that may be part of an admission algorithm module 216 on the control server 106.

In embodiments, the traffic measurements module 202 measures or determines how much over the air duration is being used by each access category in a given time interval and how much over the air time is available. For example, in a 1 sec interval, the traffic measurements module 202 may determine, measure, and/or calculate that 700 msec is available for useful user traffic (because the following loads are determined: 200 msec is being used for Voice frames, 200 ms for video, 100 for best effort, 100 for background, and 100 ms is idle). Further, the traffic measurements module 202 can determine that there are 100 msec (the idle time) that are not being used. These determination or calculations may be done by various algorithms, of which one embodiment of an algorithm is described hereinafter.

The signal interface module 212, of the access point 104, can receive requests for bandwidth to start a communication session for mobile devices 102. The signal interface 212 can receive the request 400 for bandwidth, including the amount of bandwidth requested, and send the information along with any traffic measurement information to the new flow estimator 204. Likewise, the decision as to whether the communication session will be admitted may be sent from the signal interface 212 to the mobile device 102. The new admission request 400 sent from the signal interface 212 may be sent concurrently or substantially simultaneously with the traffic measurement information to the new flow estimator 204. The new flow estimator 204 can take the information from the signal interface 212 and the traffic measurements to produce a new flow estimation that is a calculated amount of bandwidth that will be used by the access point 104 if the communication session is accepted. A decision about whether to admit the new communication session at the access point 104 must then be made. To make the decision, the new flow estimator 204 sends the new flow estimation to the admission decision module 206.

The admission decision module 206 can determine whether to admit a new communication session for the access point 104. The admission decision module 206 determines, at the time of the call or session arrival (or set up), whether or not a new call should be admitted into the network. A typical prerequisite for admission is that the Quality of Service (QoS) constraints can be satisfied without jeopardizing the QoS constraints of existing calls or sessions in the network. Denied calls are redirected to adjacent access points that have available bandwidth. Load balancing distributes the offered traffic load across all possible access devices (e.g., access points and/or radio modules) to substantially maximize the carried traffic load.

Generally, the admission decision module 206 compares the new flow estimation 204 with a maximum allowed bandwidth. The maximum allowed bandwidth may be set by a user or may be determined automatically by the type of access point 104. If the new bandwidth estimation is higher than the maximum allowed bandwidth, then the admission decision may be to deny the communication session or to find alternative access point 104 to conduct the communication session. If the decision is that the new bandwidth estimation is lower than the maximum allowed bandwidth, then the admission decision module 206 may send an admit signal 208 directed to the access point 104 to instruct the access point 104 to start communicating with the mobile device 102. If the admission decision module 206 decides not to admit the new communication session, information may be sent to a load balance module 210. The admission decision module 206 and call admission control is described in related U.S. application Ser. No. 12/716,168, filed Mar. 2, 2010, entitled "Practical Measurement-Based Session Admission Control for Wi-Fi LAN Systems."

In one configuration, the decision admission module 206 reserves bandwidth for mobility traffic to ensure a high probability of success for handoff, meaning that the call that needs to be handed off to an adjacent access point is more likely to be provided with the needed bandwidth. Resource borrowing rules can ensure maximum likelihood of handoff completion. In one configuration, the call set up request (e.g., Session Initiation Protocol (SIP) invite) is sent after the RF resources have been negotiated successfully, via the ADDTS (Tspec) message procedure, with the admission decision and load balance modules 206 and 210.

The load balance module 210 may determine another access point 104 to conduct a communication session with the mobile device 102. As such, the load balance module 210 and signaling to and from the load balance module 210, including the alternate signal 214, are described in the related application. The load balance module 210 performs both load balancing (before session establishment) and load shifting (after session establishment). The load balance module 210 allows the access point to distribute the load among neighbor access points 104 in a network instead of blocking the incoming association or session request due to lack of resources.

Mobile devices 102 normally associate with the access point 104 that has the strongest signal to ensure maximum RF efficiency and lowest bandwidth. When there is a high traffic load within an access point 104 serving area or zone, an excessive number of mobile stations 102 will recognize the access point 104 as having the strongest signal, placing excessive demand on the access point 104. This situation can occur due to an unexpected number of mobile users entering the zone or an unexpected application load (i.e., group video conference). These events generally result in stranded bandwidth (i.e., bandwidth available at adjacent access points not being used) and less than the maximum carried network load. The load balance module 210 addresses these issues in various ways.

When, at the point of a new call session request (e.g., based on a Tspec) and during mobility handover (from one access point 104a to another 104b) and when the admission decision module 206 is not able to accept a new call session (e.g., due to changing RF conditions or other factors), control is passed to the load balance module 210 or an adjacent access point 104b that can better handle the session load. When a mobile device 102 first powers up and makes the association with an access point 104, the signaling invokes the load balance module 210 to interact with the mobile device 102 and ensure that the best access point is selected. This decision is normally effected by an algorithm that considers both RF signal strength at the mobile device 102 or each access point 104 for the mobile device 102 and the RF signal availability or available bandwidth at each access point. The access point 104 having the best combination of RF signal strength and RF signal availability is selected as the access point 104 to be associated with the mobile device 102.

The load balance module 210 can also consider session quality in the selection algorithm. Session quality variations, as determined by a low Mean Opinion Score (MOS) and other measures are reported to the load balance module 210. Once the access point 104 is selected, the load balance module 210 manages a seamless (from the user's viewpoint) handoff from the initially contacted access point 104 to the selected access point 104.

Figure 3:
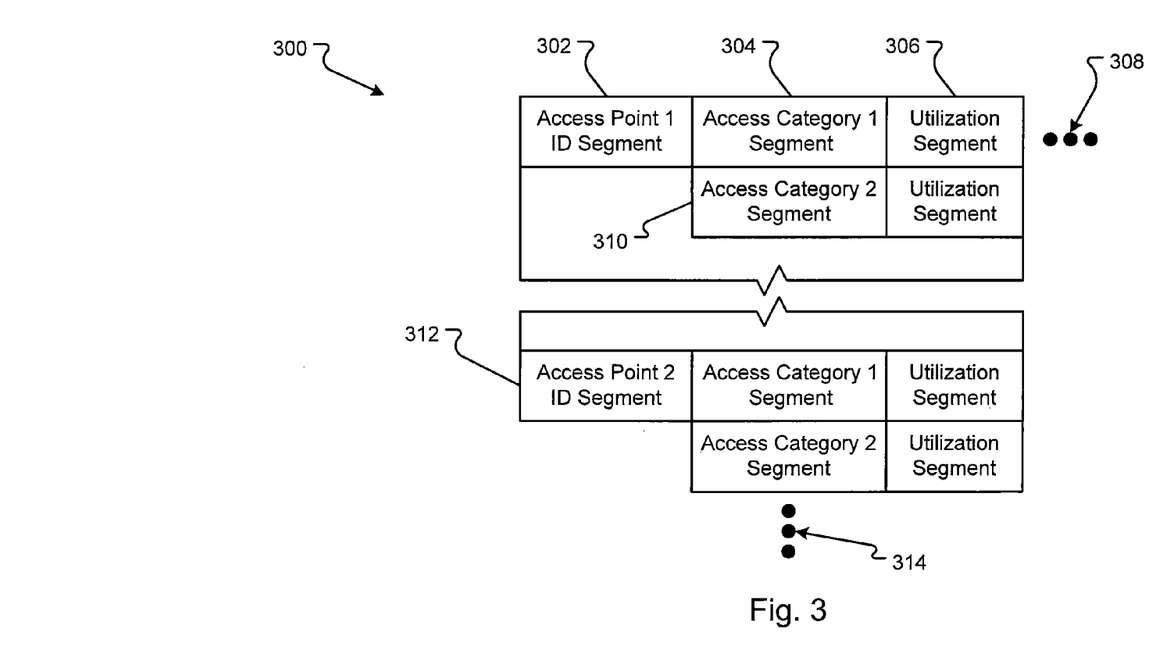
FIG. 3 is a block diagram of an embodiment of a utilization data structure.

An embodiment of a utilization data structure 300 is shown in FIG. 3. The utilization data structure 300 can include one or more data segments that contain data regarding the RF utilization of an access point 104. The information included in a utilization data structure 300 can be collected or calculated by the access point 104, or, in other embodiments, may be received from the access point 104 and/or calculated by a control server 106. The utilization data structure 300 can include an access point 1 identifier segment 302, an access class 1 segment 304, and/or a utilization measurement segment 306. The utilization data structure 300 may include more or fewer data segments than those shown in FIG. 3, as represented by ellipses 308.

The access point 1 identifier segment 302 can include an identifier (ID) for an access point 104. Thus, access point 104a may have a first identifier stored in the access point 1 ID segment 302. Further, the utilization data structure 300 may include one or more other the access point identifiers with associated information. For example, access point 104*b* may have an access point 2 identifier stored in access point 2 identifier segment 312. Each access point 104 may then include other information associated with the access point identifier stored in the access point ID segment 302.

Each access point 104 can determine the access class or access class of information that is associated with the utilization measurement. The access class is stored in the requested access class segment 304 or the access class 2 segment 310. For example, with the 802.11 wireless communications, the access classes may include video data, voice data, and other data. Thus, access class 1 segment 304 can store an access category identifier for voice data while the access class 2 segment 310 can store an identifier for video data.

For each access class, there is a utilization measurement. The utilization measurement is stored in the utilization measurement segment 306. Utilization is a calculated measure of the RF utilization associated with both the access class and the access point 104. In embodiments, the utilization calculation is determined by taking the quotient of the frames size of a communication session divided by the physical layer frame transmission rate, summing each of those quotients for all the active communication sessions (or communication sessions in progress) for an access class and adding frame overhead. Overhead may be everything aside from the actual data which is sent at the data PHY rate needed to transmit a frame. Overhead can include a preamble and a header (which precedes every frame), a short Acknowledgement frame sent back from the receiver, and short pauses known as Interface spaces that must be inserted between each frame. Each of these "frame air times" is summed together for all active communication sessions on the access point 104. The sum is then divided by the measurement time. That quotient is equal to the RF utilization for that access class. The quotient is stored in the utilization measurement segment 306. The access point 104 can then generate utilizations for each of the access classes. All this information may then be stored in the utilization data structure 300 and sent to the control server 106. Further access points 104 may make the same calculations that send the utilization information to control server 106. There may be more or fewer access points 104 sending utilization data structures 300 to the control server 106, as represented by ellipses 314. The utilization information may be used by the control server 106 to determine whether or not to admit a new call or new communication session at an access point 104.

Figure 4:
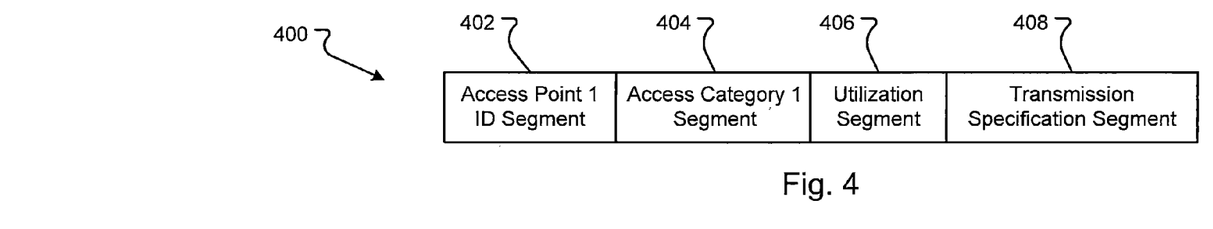
FIG. 4 is a block diagram of an embodiment of a new admission data structure.

A request 400 for a new communication session or call is shown in FIG. 4. The request 400 may include one or more data segments where each data segment may store an item of data. The data segments may be associated with the new communication session request 400 can include a requested access point identifier segment 402, a requested access class segment 404, a utilization segment 406, and/or a transmission specification segment 408. The access point ID segment 402 can be the same or similar to access point ID segment 302. Likewise, the requested access class segment 404 may be the same or similar to access class 304, while the utilization segment 406 may the same or similar to utilization measurement segment 306. The data stored within these different segments, 402, 404, and/or 406 may the same or similar to the data stored in segments 302, 304, and/or 306. As such, the segments 402, 404, and/or 406 shall not be explained further.

The transmission specification segment 408 can store information received from a mobile device 102 and a request 400 for a new communication session from an access point 104. The transmission specification can include what type of access class the mobile device 102 wishes to communicate. For example, the mobile device 102 may request a voice call through the wireless access point 104. As such, the access class may be for voice data. Further, the transmission specification can also include how much bandwidth is requested. The information from the mobile device 102 may be stored in the transmission specification segment 408 and then the new communication session request 400 can be sent to the control server 106.

Figure 5:
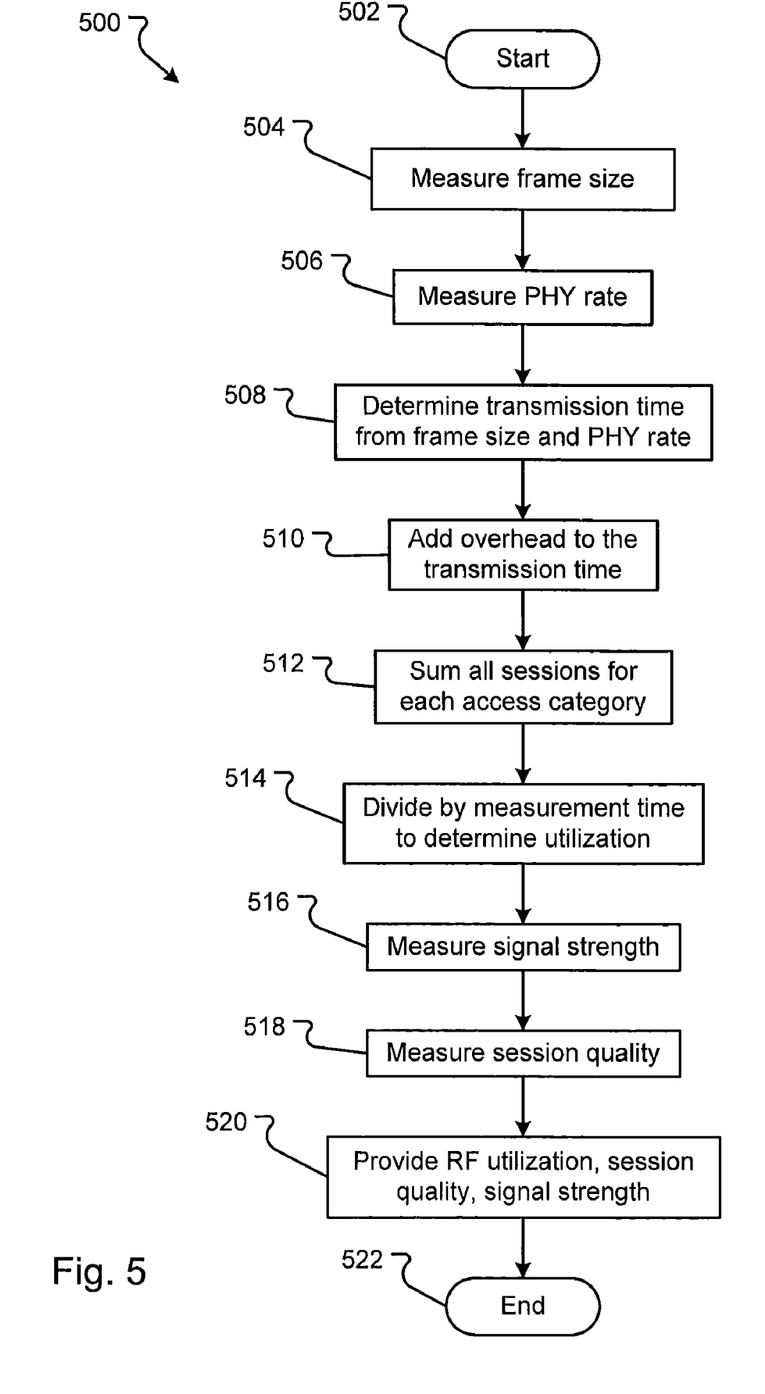
FIG. 5 is a flow diagram of an embodiment a process for determining measures for the load at an access point.

An embodiment of a method 500 for measuring and calculating radio frequency utilization is shown in FIG. 5. Generally, the method 500 begins with a start operation 502 and terminates with an end operation 518. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-4. It should be noted that the determination of utilization may be made on a per access class basis, i.e., a measure of utilization for voice, video, best effort, etc.

The traffic measurements module 202 measures the frame size, in step 504. Frame size may be standard or may be variable. In embodiments, the frame size is standard according to a communication protocol. The number of frames sent is determined if the frame size is not standard. The number of frames and the number of bits or bytes of the frame may be determined to determine the average frame size.

The traffic measurements module 202 may then measure the physical layer data transmission rate (PHY), in step 506. PHY is a measure of the number of bits per second that are transmitted or received in the physical layer of the access point 104.

From the frame size and the PHY rate, the traffic measurements module 202 may determine a transmission time, in step 508. To determine a data transmission time, the frame size is divided by the PHY rate. The quotient of this calculation is the transmission time. The traffic measurements module 202 may then add the frame overhead to the transmission time, in step 510. Frame overhead can include any control bits or other information needed in the transmission of data frames between the mobile device 102 and the access point 104.

The transmission times for one or more communication sessions for an access class are then summed by the traffic measurements module 202. Thus, for all voice, video, or data communication sessions, the traffic measurements module 202 can sum the transmission times for each of those communication sessions and on a per access class basis, in step 512. The sum is the data air time. The data air time for the access class is then divided by the measurement time to determine the RF utilization, in step 514. The traffic measurements module 202 may have set measurements periods that occur periodically. For example, the measurement period may be every one second, every five seconds, etc. The amount of time between measurement periods or the measurement time may be used to determine the RF utilization by dividing the data air time by the measurement time. The result of this computation is the radio frequency utilization. The RF utilization may then be provided by the traffic measurements module 202 to a new flow estimator 204 or admission algorithm module 216, in step 516. In other embodiments, the PHY rate, frame size, and other information may be sent to the new flow estimator 204. The new flow estimator 204 may then calculate the RF utilization.

Figure 10:
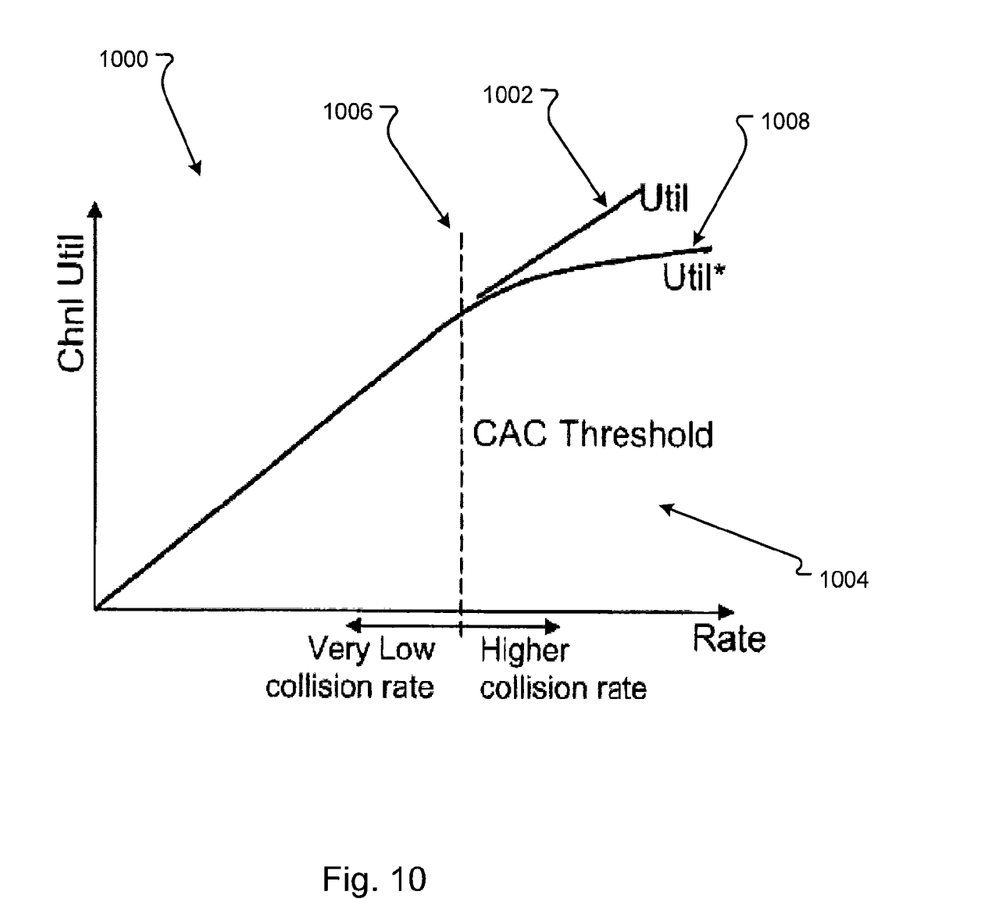
FIG. 10 is a graph showing utilization in a non-collision and collision region.

To determine channel utilization (RF utilization), the new flow estimator 204 may add the number of frames, overhead, and the amount of collisions. However, collisions are difficult to measure. Generally, once an access point 104 enters the collision region 1004 (bounded by line 1006) the effective utilization 1008 of the bandwidth lessens, as shown in the graph in FIG. 10. Here, the measure bandwidth 1008 is lower than the calculated bandwidth 1002 due to collisions. To determine actual utilization, embodiments herein use an algorithm that can effectively account for collisions and measure air time utilization.

An algorithm used to determine utilization per access class or access class is shown in the equation below.

$$\text{Utilization (per Access Class)} = \frac{\sum \left( \sum (\text{Frame Size}/PHY) + \text{Frame Overhead} \right)}{\text{Measurement Period}}$$

Here, frame size is the size of the frames being transmitted. The PHY is the physical layer data transmission rate. The frame overhead is the amount of overhead per frame or for all frames being transmitted. The measurement period is the time between each measurement.

The access point 104 can also measure signal strength, in step 516. The signal interface 212 can measure the amount of signal strength between any one mobile device 102 and the access point 104. Measuring the signal strength of a communication link between the mobile device 102 and the access point 104 is understood in the art and will not be explained further.

The access point 104 may then measure the signal or session quality parameters for one or more communication sessions being conducted by the wireless access point 104. The signal or session quality parameters can include quality of signal (QoS) parameters, for example, latency, dropped frames, interference, and other such measures. The signal interface 212 of the access point 104 may measure the QoS parameters and provide them in a package as session quality measures.

The access point 104 may provide the RF utilization, the signal strength, the session quality parameters, and/or any other measure of performance of the access point 104 to the new flow estimator 204 and/or the load balance module 210. The load balance module 210 may use different or more characteristics than those described herein to determine the functioning and efficiency of the wireless network, which can include two or more access points 104, or the load on an access point 104.

Figure 6:
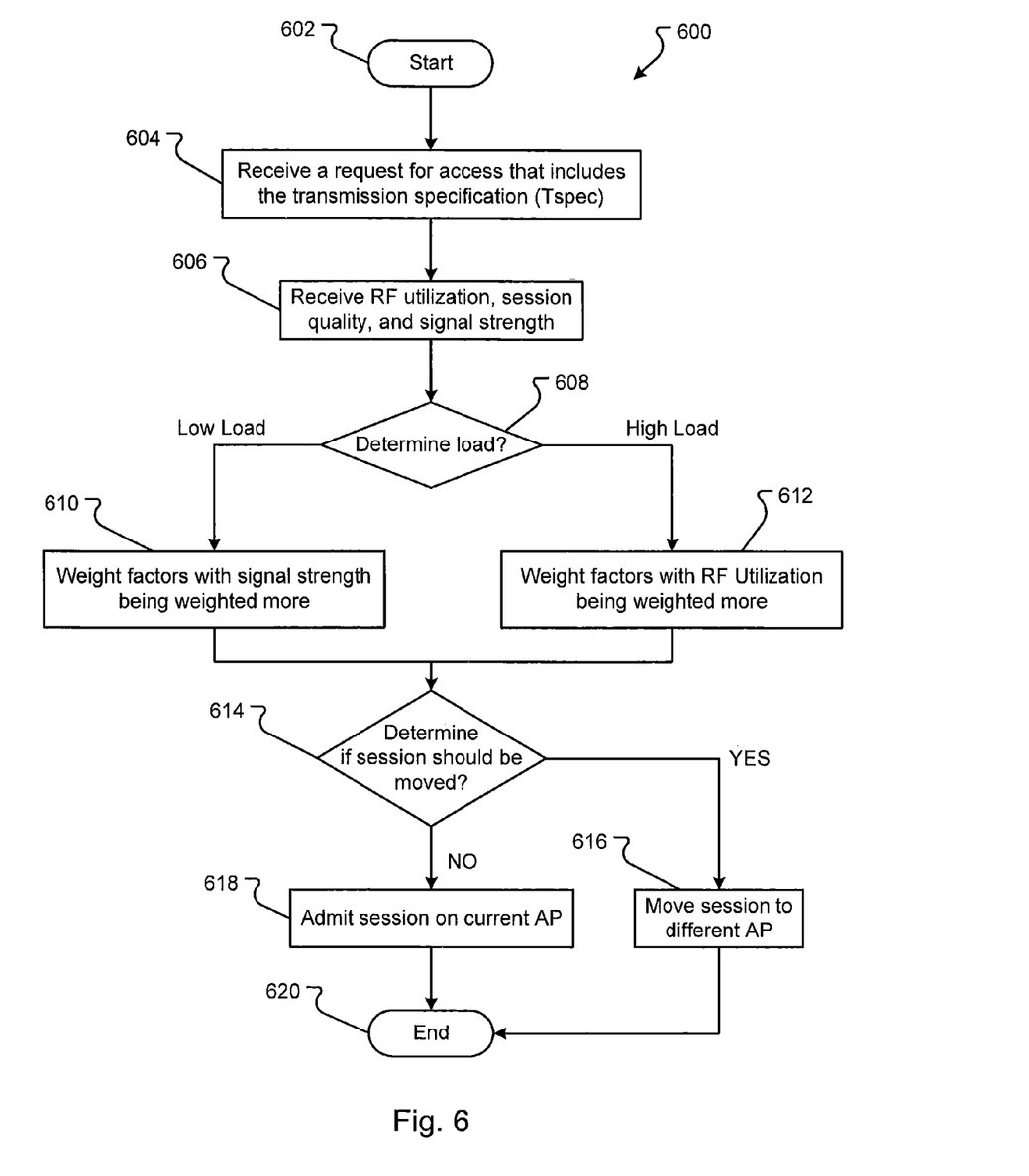
FIG. 6 is a flow diagram of an embodiment a process for distributing load with a control server.

An embodiment of a method 600 for requesting a new communication session is shown in FIG. 6. Method 600 is from the perspective of the access point 104. Generally, the method 600 begins with a start operation 602 and terminates with an end operation 620. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-4.

The new flow estimator 204 of the control server 106 can receive, from the access point 104, a request for access that includes an Add Traffic Stream (ADDTS) frame with a Traffic Specification (Tspec) from the signal interface module 212, in step 604. Tspec permits calls with different traffic requirements to be considered, enables mobile device 102 handoffs, such as for load balancing, and provides the resource requirements for the call. The request for access to the access point 104 can be made by a mobile device 102. The request can include an access class and an amount of bandwidth needed for the communication session. These parameters can be included in the Tspec.

The new flow estimator 204 can also receive the current RF utilization, the session quality, the signal strength, and any other parameter measured by the traffic measurements module 202 of the access point 104, in step 606. The traffic measurements module 202 can measure the load or use the other information to determine how busy or saturated the access point 104 is at the current time. The RF utilization, the session quality, the signal strength, and load information may be provided to the admission decision module 206 or the load balance module 210.

The admission decision module 206, which determines (before call completion or set up) whether or not to admit the call for the first access point 104a, or load balance module 210, which determines (before call completion or while a completed call is in progress) which of the access points 104a-d should handle a selected call, can determine the load for the first access point 104a, which sent the request for access from the mobile device 102, and one or more other access points 104b, 104c, and/or 104d. Generally, admission decision module 206 can decide to admit or reject the call at the access point 104a that received the request based on all the load information and other information. If the call is rejected at access point 104a, the load balance module 210 can assemble a prioritized list of alternative access points 104b-d based again on the load information of the access points 104b-d and recommend the alternative access points 104b-d to the mobile device 102.

Thus, from the RF utilization, the session quality, the signal strength, and/or load information received from the access points 104a-d, the admission decision module 206 or load balance module 210 can determine the loads on each access point in the wireless network, in step 608. If the admission decision module 206 or load balance module 210 determines that the access point 104a that received the request for access has a high load, step 608 proceeds through the high load branch to step 612. However, if the admission decision module 206 or load balance module 210 determines that the access point 104a that received the request for access has a low load (compared to other access points 104b-d), the step 608 proceeds through the low load branch to step 610. Thus, admissions can be based on loads of two or more access points 104a-d and not necessarily only on the load of the access point 104a that received the admission request.

In one configuration, when adequate resources are available for the call and/or the call category, the admission decision module 206 admits the call and, when inadequate resources are available for the call and/or the call access category, the admission decision module 206 does not admit the call. In the latter case, the admission decision module 206 can, if permitted by fairness policies and/or rules, borrow and subsequently return available bandwidth from other access categories. Resource sharing among access categories can be a powerful capability to maximize system capacity while ensuring high quality for the session admission decision module-accepted call session. For example, resources from voice, video, and data access categories can be shared for mass call events (or the receipt of multiple call sessions between measurement intervals or mobility handovers). In the example, a predetermined percentage of resource (e.g., channel bandwidth) for each category is designated as being subject to sharing with other access categories. Alternatively, the call can be handed off, by the load balance module 210, to adjacent radio modules or access points 104.

In step 610, the admission decision module 206 or load balance module 210 weights the factors received from the signal interface module 212 and/or other traffic measurements module 202 of each access point 104. For example, the load balance module 210 may weigh the RF utilization, session quality, or signal strength. Each of the weights may be different for each parameter, such that, depending on the type of load, one factor or parameter may receive a higher weight than another. In low load situations, as in step 610, the load balance module 210 may weigh the signal strength of the access point 104 more than the other factors. As such, the determination as to which access point 104 should receive the new communication with the mobile device 102 may be based on which access point 104 provides the highest signal strength. In high loads situations, such as in step 612, the load balance module 210 may weigh the RF utilization more than any of the other parameters. As such, in high load situations, the access point 104 that has the most capacity or ability to handle the new request will be more likely chosen than other access points 104. After the factors are weighted, the method 600 proceeds to step 614.

The load balance module 210 can determine if the communication session requested should be moved from the first access point 104a to another access point 104b, 104c, and/or 104d, in step 614. The load balance module 210 can determine if the session should be moved based on the weighted factors. For example, if in a low load situation and the access point 104a has high signal strength and received the request from the mobile device 102, the request for new communication session should remain with the access point 104a. However, if the signal strength of the access point 104a is low and another access point 104b, 104c, or 104d provides a higher signal strength, then the communication session should be removed to the other access point 104b, 104c, or 104d. Likewise, in high load situations, if the access point 104a that received the request has a low RF utilization, then the communication session should stay with that access point 104a. However, if the access point 104a has a high RF utilization and another access point has a lower RF utilization, then the communication session should be moved to another access point 104b, 104c, or 104d that has a lower RF utilization.

If the requested communication session should be moved, step 614 proceeds "YES" to step 616 where the load balance module 210 directs the admission decision module 206 to send the admit signal 208 to the access point 104a to admit the current session. However, if the requested communication session should be moved, the step 614 proceeds "YES" to step 616 where the load balance module 210 sends information to admission decision module 206 as to which access point 104b, 104c, or 104d should be used for the communication session. In other embodiments, the load balance module 210 may send an alternate signal 214 directly to the access point 104. An alternate signal 214 can direct the communication session to a different access point 104b, 104c, or 104d. The information in the alternate signal 214 can include which access point 104b, 104c, or 104d with which to communicate. The alternate signal 214 can also include an address for the other access points 104b, 104c, or 104d, such that the mobile device 102 can communicate directly with that access point 104b, 104c, or 104d to start a communication session.

Thus, with method 600, the control server 106 can dynamically direct the new traffic from mobile devices 102 to the best access point 104 depending on the type of load conditions. Thus, if there are low load conditions on the access points 104a, 104b, 104c, and 104d, the signal strength is determinative of which access point 104a, 104b, 104c, or 104d will conduct a communication. In high load conditions, the access point 104a, 104b, 104c, or 104d with the lowest RF utilization is used for the new communication session.

Figure 7:
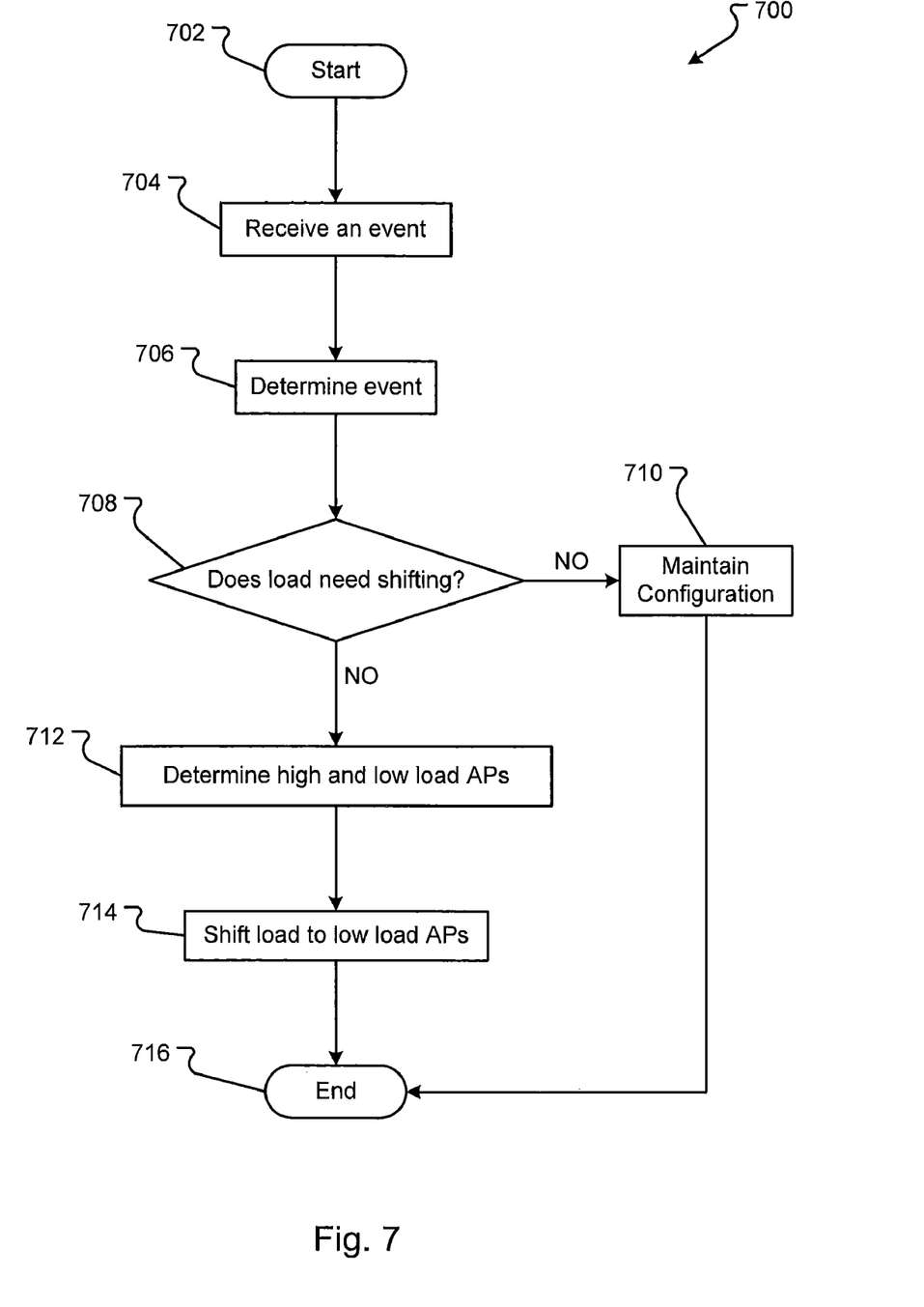
FIG. 7 is a flow diagram of an embodiment a process for proactively distributing load in a wireless network.

An embodiment of a method 700 for proactively distributing load based on an event is shown in FIG. 7. Generally, the method 700 begins with a start operation 702 and terminates with an end operation 716. While a general order for the steps of the method 700 are shown in FIG. 7, the method 700 can include more or fewer steps or arrange the order of the steps differently than those shown in FIG. 7. The method 700 can be executed as a set of computer-executable instructions executed by a computer system and encoded or stored on a computer readable medium. Hereinafter, the method 700 shall be explained with reference to the systems, components, modules, software, data structures, etc. described in conjunction with FIGS. 1-4.

The load balance module 210 can receive an event, in step 704. An event can be any condition which changes the dynamics, performance, load conditions, or other characteristic of the wireless network on any of the one or more access points 104. For example, an event can be a signal interference condition, a failed access point, an access point that is no longer communicating, or a sudden rush of incoming communication traffic. Further, the event may be something that is set or pre-determined by user, such as a threshold for a load parameter.

The load balance module 210 can determine the event, in step 706. From the determined event, the load balance module 210 can determine if load needs to be shifted proactively, in step 708. Load is shifted by interchanging or switching communication sessions from a first access point 104a to a second access point 104b or by directing all new incoming requests for new communication sessions to access points 104 with lower loads. Thus, if no load shifting is required, the step 708 proceeds "NO" to step 710 and the current load configuration is maintained by the load balance module 210. If the load does need shifting, step 708 proceeds "NO" to step 712.

The load balance module 210 can determine the loads on each access point 104, in step 712. The load balance module 210 can determine which access points 104 have higher loads and which have lower loads. The load information is determined by information sent from the traffic measurements module 202 and is associated with each of the access points 104. The loads may be determined by RF utilization or other types of characteristics which characterize the functioning of each access point 104. For example, loads may be determined by QoS measures or other parameters.

The load balance module 210 may then shift loads from access points 104 with high loads to access points 104 with low loads, in step 714. The shifting of loads can happen such that access points 104 in high traffic areas can direct communication sessions to other access points 104 that are in low communication areas. Thus, the load balance module 210, in high load conditions, can move loads to access points 104 which may have a lower signal strength but a lower RF utilization. Likewise, the load balance module 210, in low load conditions, can move loads to access points 104 which may have a higher signal strength and a higher RF utilization. To shift the loads, the load balance module 210 may send an alternate signal 214 to one or more access points 104 to direct communication sessions to different access points 104. The alternate signal 214 may include the address of the alternate access points 104, plus any information on specific communication sessions that may need to be moved. For example, if there is heavy video or voice traffic on one access point 104a, the alternate signal 214 can direct the access point 104a to shift communication sessions in a video or voice access class to a different access point 104b, 104c, or 104d. Further, access point 104a can accept more communications sessions that are in a data class. As such, the load balance module 210 can control loads based on the access class of the communications occurring at each access point 104.

The advantages of the embodiments presented herein are numerous. The system, in a high load condition, can find admission solutions (i.e., match up mobile devices with access points) that maximizes the total wireless network system throughput and capacity. Some individual mobile devices may be pushed to access points that are farther away and get lower signal quality, but, overall, across all mobile devices accessing the wireless network, the total capacity is increased. As such, the wireless network performs better and more efficiently.

Figure 8:
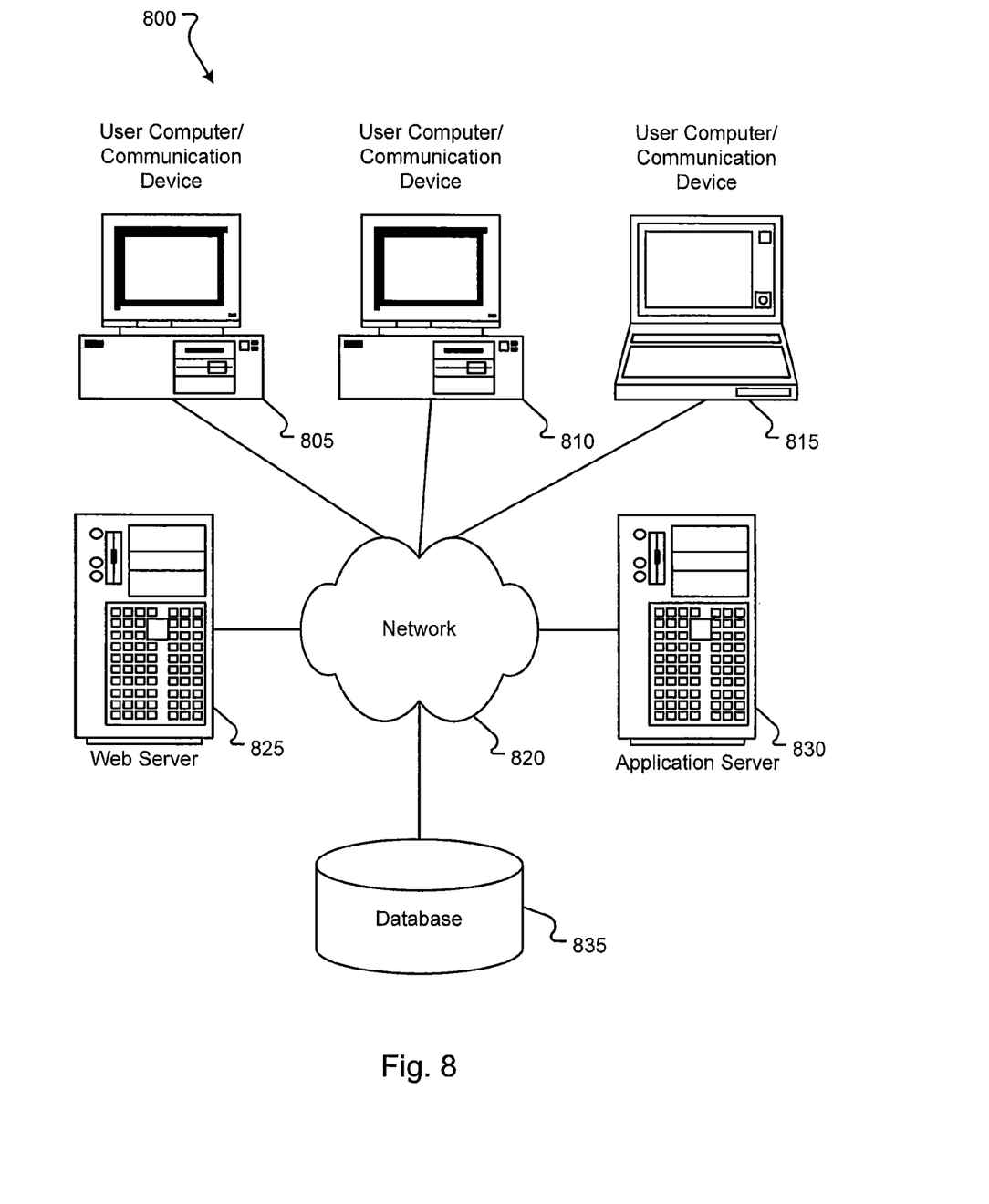
FIG. 8 is a block diagram of an embodiment of a computing environment.

FIG. 8 illustrates a block diagram of a computing environment 800 that may function as servers, computers, or other systems provided herein. The environment 800 includes one or more user computers 805, 810, and 815. The user computers 805, 810, and 815 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 805, 810, 815 may also have any of a variety of applications, including for example, database client and/or server applications, and web browser applications. Alternatively, the user computers 805, 810, and 815 may be any other electronic device, such as a thin-client computer, Internet-enabled mobile telephone, and/or personal digital assistant, capable of communicating via a network 820 and/or displaying and navigating web pages or other types of electronic documents. Although the exemplary computer environment 800 is shown with three user computers, any number of user computers may be supported.

Environment 800 further includes a network 820. The network 820 may can be any type of network familiar to those skilled in the art that can support data communications using any of a variety of commercially-available protocols, including without limitation SIP, TCP/IP, SNA, IPX, AppleTalk, and the like. Merely by way of example, the network 820 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 602.11 suite of protocols, the Bluetooth™ protocol known in the art, and/or any other wireless protocol); and/or any combination of these and/or other networks. The network 820 may be the same or similar to network 109.

The system may also include one or more server 825, 830. In this example, server 825 is shown as a web server and server 830 is shown as an application server. The web server 825, which may be used to process requests for web pages or other electronic documents from user computers 805, 810, and 815. The web server 825 can be running an operating system including any of those discussed above, as well as any commercially-available server operating systems. The web server 825 can also run a variety of server applications, including SIP servers, HTTP servers, FTP servers, CGI servers, database servers, Java servers, and the like. In some instances, the web server 825 may publish operations available operations as one or more web services.

The environment 800 may also include one or more file and or/application servers 830, which can, in addition to an operating system, include one or more applications accessible by a client running on one or more of the user computers 805, 810, 815. The server(s) 830 and/or 825 may be one or more general purpose computers capable of executing programs or scripts in response to the user computers 805, 810 and 815. As one example, the server 830, 825 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 830 may also include database servers, including without limitation those commercially available from Oracle, Microsoft, Sybase™, IBM™ and the like, which can process requests from database clients running on a user computer 805.

The web pages created by the server 825 and/or 830 may be forwarded to a user computer 805 via a web (file) server 825, 830. Similarly, the web server 825 may be able to receive web page requests, web services invocations, and/or input data from a user computer 805 and can forward the web page requests and/or input data to the web (application) server 830. In further embodiments, the web server 830 may function as a file server. Although for ease of description, FIG. 6 illustrates a separate web server 825 and file/application server 830, those skilled in the art will recognize that the functions described with respect to servers 825, 830 may be performed by a single server and/or a plurality of specialized servers, depending on implementation-specific needs and parameters. The computer systems 805, 810, and 815, web (file) server 825 and/or web (application) server 830 may function as the system, devices, or components described in FIGS. 1-3.

The environment 800 may also include a database 835. The database 835 may reside in a variety of locations. By way of example, database 835 may reside on a storage medium local to (and/or resident in) one or more of the computers 805, 810, 815, 825, 830. Alternatively, it may be remote from any or all of the computers 805, 810, 815, 825, 830, and in communication (e.g., via the network 820) with one or more of these. The database 835 may reside in a storage-area network ("SAN") familiar to those skilled in the art. Similarly, any necessary files for performing the functions attributed to the computers 805, 810, 815, 825, 830 may be stored locally on the respective computer and/or remotely, as appropriate. The database 835 may be a relational database, such as Oracle 10i™, that is adapted to store, update, and retrieve data in response to SQL-formatted commands.

Figure 9:
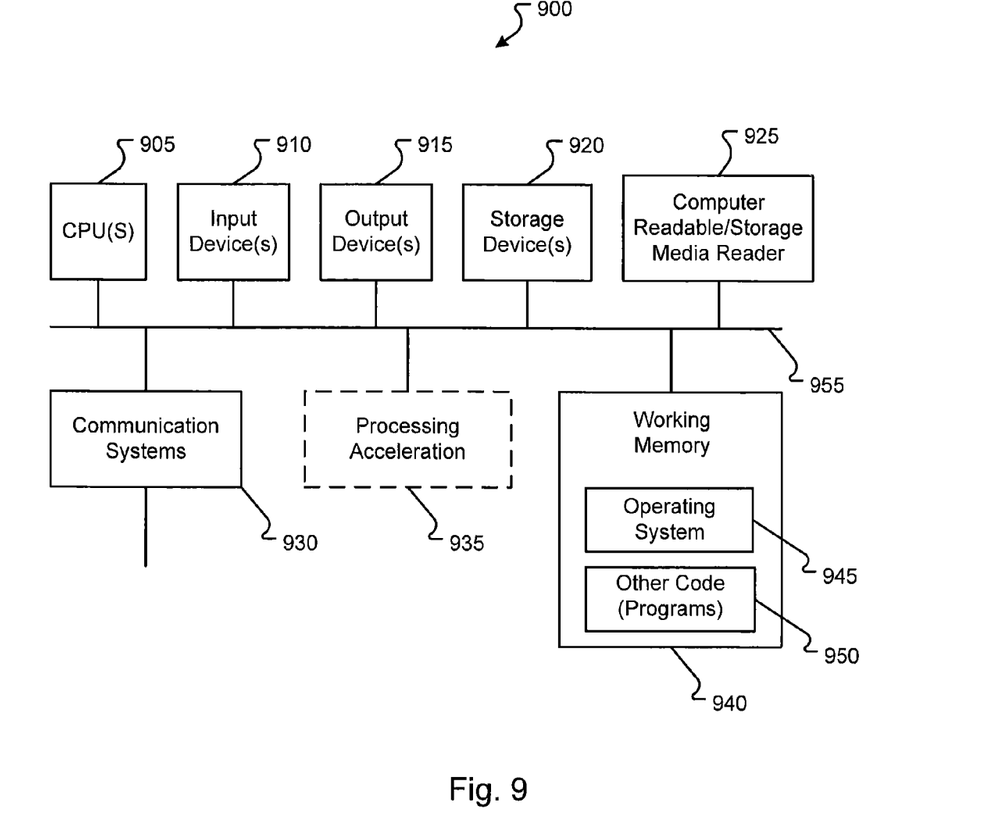
FIG. 9 is a block diagram of an embodiment of a computer system.

FIG. 9 illustrates one embodiment of a computer system 900 upon which the servers, computers, or other systems or components described herein may be deployed or executed. The computer system 900 is shown comprising hardware elements that may be electrically coupled via a bus 955. The hardware elements may include one or more central processing units (CPUs) 905; one or more input devices 910 (e.g., a mouse, a keyboard, etc.); and one or more output devices 915 (e.g., a display device, a printer, etc.). The computer system 900 may also include one or more storage devices 920. By way of example, storage device(s) 920 may be disk drives, optical storage devices, solid-state storage devices such as a random access memory ("RAM") and/or a read-only memory ("ROM"), which can be programmable, flash-updateable and/or the like.

The computer system 900 may additionally include a computer-readable storage media reader 925; a communications system 930 (e.g., a modem, a network card (wireless or wired), an infra-red communication device, etc.); and working memory 940, which may include RAM and ROM devices as described above. The computer system 900 may also include a processing acceleration unit 935, which can include a DSP, a special-purpose processor, and/or the like.

The computer-readable storage media reader 925 can further be connected to a computer-readable storage medium, together (and, optionally, in combination with storage device (s) 920) comprehensively representing remote, local, fixed, and/or removable storage devices plus storage media for temporarily and/or more permanently containing computer-readable information. The communications system 930 may permit data to be exchanged with the network 820 (FIG. 8) and/or any other computer described above with respect to the computer system 900. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 900 may also comprise software elements, shown as being currently located within a working memory 940, including an operating system 945 and/or other code 950. It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for measuring factors related to load balancing in a wireless network, the method comprising:
    a processor determining at least an over-the-air utilization at one or more access points;
    from the determined at least the over-the-air utilization, the processor determining if there is an access load at the one or more access points, wherein determining the at least an over-the-air utilization comprises determining a radio frequency (RF) utilization for each of one or more radios associated with the one or more access points and wherein determining the RF utilization comprises:
        based on a frame size of one of more frames communicated between the one or more access points and at least one mobile device, and a data rate (PHY) for the one or more frames, the processor determining a transmission time for the one or more frames;
        the processor adding overhead time to the determined transmission time;
        the processor summing the added overhead and determined transmission times for at least two communication sessions associated with a data air time;
        the processor dividing the data air time by a measurement time to determine the RF utilization;
        the processor measuring a signal strength between the one or more access points and the at least one mobile device;

the processor measuring a quality of a signal for a communication with the at least one mobile device; and the processor moving an access load to one or more other access points with lower over-the-air utilization.

2. The method as defined in claim 1, wherein the determined RF utilization, the measured signal strength, and the measured quality of the signal are provided to a control server and wherein the access load is a function of one or more of the determined RF utilization, the measured signal strength, and the measured quality of the signal.

3. The method as defined in claim 1, wherein an access load on the one or more access points is determined from at least one of the group comprising: the RF utilization, the signal strength, and the quality of the signal measurements.

4. The method as defined in claim 1, wherein a control server:
   receives the RF utilization, the signal strength, and the quality of the signal measurements from two or more access points;
   determines an access load on each of the two or more access points based on the RF utilization, the signal strength, and the quality of the signal measurements; and
   shifts an access load from a first access point to a second access point based on the determined access loads of the first access point and the second access point.

5. The method as defined in claim 4, wherein the access load from the first access point is shifted proactively.

6. The method as defined in claim 4, wherein the access load from the first access point is shifted based on a request for a new communication session.

7. The method as defined in claim 4, wherein the access load from the first access point is shifted from the first access point with a higher RF utilization and a higher signal strength to the second access point with a lower RF utilization and a lower signal strength.

8. The method as defined in claim 4, wherein the access load from the first access point is shifted from the first access point with lower RF utilization and a lower signal strength to the second access point with a higher RF utilization and a higher signal strength.

9. A non-transitory computer readable medium, stored on a tangible medium, having stored thereon instructions that cause a computing system to execute a method for shifting a load between two or more access points in a wireless network, the instructions comprising:
   instructions to receive a request for a communication session between a first wireless access point and a mobile device, wherein the request includes an access class and the load is determined for the access class on the first wireless access point;
   instructions to receive a RF utilization and a signal strength;
   instructions to determine a load on at least the first wireless access point;
   based on the RF utilization, the signal strength, and the load, instructions to move the requested communication session to a second wireless access point;
   instructions to determine if there is less load on the second wireless access point for the access class;
   if there is less load on the second wireless access point for the access class, send a signal to the first wireless access point to instruct the mobile device to communicate with the second wireless access point for the communication session; and
   if there is more load on the second wireless access point for the access class, send a signal to the first wireless access point to admit the communication session.

10. The non-transitory computer readable medium as defined in claim 9, after admitting the communication session, the instructions further comprising:
    instructions to receive an event;
    instructions to determine the event;
    based on the event, instructions to determine if a load needs shifting;
    if the load does not need shifting, maintaining a configuration of the first and second wireless access points;
    if the load needs shifting, determining a load on the first wireless access point and the second wireless access point;
    if the load on the second wireless access point is greater, shifting load from the second wireless access point to the first wireless access point; and
    if the load on the first wireless access point is greater, shifting load from the first wireless access point to the second wireless access point.

11. The non-transitory computer readable medium as defined in claim 9, wherein the instructions to determine if load needs shifting further comprises weighting the RF utilization or the signal strength to determine which wireless access points should receive more load.

12. The non-transitory computer readable medium as defined in claim 11, wherein the RF utilization is weighted more during high loads.

13. The non-transitory computer readable medium as defined in claim 11, wherein the signal strength is weighted more during low loads.

14. A communication system comprising:
    two or more wireless access points, the two or more wireless access points configured to measure a radio frequency (RF) utilization and a signal strength and configured to communicate with at least one mobile device, wherein a communication with the at least one mobile device represents a load on one of two or more wireless access points; and
    a control server in communication with the two or more wireless access points, the control server configured to receive the RF utilization, the signal strength, and an amount of load from each of the two or more wireless access points, configured to weigh the measured RF utilization or the measured signal strength more than other factors and, depending on the amount of load on the two or more wireless access points, and based on the weighted values of the measured RF utilization and the measured signal strength, configured to shift a load from a first wireless access point to a second wireless access point.

15. The communication system as defined in claim 14, wherein each of the two or more wireless access points comprises:
    a traffic measurements module configured to measure the RF utilization and the load; and
    a signal interface module configured to measure the signal strength.

16. The communication system as defined in claim 14, wherein the control server comprises a load balance module configured to determine a load and to shift the load.

* * * * *